April 9, 1963 P. H. SNOBERGER 3,084,864
CONTROL APPARATUS FOR HEATING AND COOLING SYSTEMS
Filed Dec. 8, 1960 4 Sheets-Sheet 1

INVENTOR
PHILIP H. SNOBERGER
BY
ATTORNEY

April 9, 1963   P. H. SNOBERGER   3,084,864
CONTROL APPARATUS FOR HEATING AND COOLING SYSTEMS
Filed Dec. 8, 1960   4 Sheets-Sheet 2

INVENTOR
PHILIP H. SNOBERGER
BY Roy E. Raney
ATTORNEY

April 9, 1963 P. H. SNOBERGER 3,084,864
CONTROL APPARATUS FOR HEATING AND COOLING SYSTEMS
Filed Dec. 8, 1960 4 Sheets-Sheet 3

INVENTOR
PHILIP H. SNOBERGER
BY Roy E. Raney
ATTORNEY

INVENTOR
PHILIP H. SNOBERGER

ATTORNEY

United States Patent Office 3,084,864
Patented Apr. 9, 1963

3,084,864
CONTROL APPARATUS FOR HEATING AND COOLING SYSTEMS
Philip H. Snoberger, Pompano Beach, Fla., assignor to Ranco Incorporated, Columbus, Ohio, a corporation of Ohio
Filed Dec. 8, 1960, Ser. No. 74,655
2 Claims. (Cl. 236—1)

The present invention is directed to improvements in heating and cooling system control means, and more particularly to a novel valve and thermostatic control of the type wherein a solenoid operated valve is provided for controlling the flow of a heating or cooling medium, such as a liquid, to a radiator in a room air conditioner, the operation of the valve being controlled by a thermostat responsive to the room air temperature, and the valve having a second thermostatic means associated therewith by which the circuit for the room thermostat control is modified according to the temperature of the fluid in the heating or cooling system whereby during cold weather the room thermostat functions to control the valve to maintain a minimum temperature and during warm weather the same room thermostat controls the valve to maintain a maximum room temperature.

It is a primary object of this invention to provide a solenoid operated valve having a thermostatic control apparatus attached thereto including switch means actuated by a thermostatic element for modifying room thermostat control of the valve, wherein the thermostatic element and switch means are mounted on a common frame and are adapted thereby to be readily disassembled from and assembled with the valve.

Another of the objects of the invention is to provide in combination with a solenoid operated valve of the type mentioned a housing structure supported by a frame and containing a double throw switch operated by a thermostatic element responsive to the temperature of the liquid flowing through the valve to which the frame is secured, the thermostat having a thermally responsive portion comprising a flat coil which lies against one wall of the liquid valve and which is snugly retained in engagement with the wall by an insulating member interposed between the frame and the valve wall, the housing structure also serving as a terminal or conduit box for the solenoid which operates the valve.

Other objects and advantages of the invention will be apparent from the following description of a preferred form of the invention, reference being made to the accompanying drawings wherein—

FIG. 6 is a fragmentary sectional view taken along line 6—6 of FIG. 1;

Figure 1:
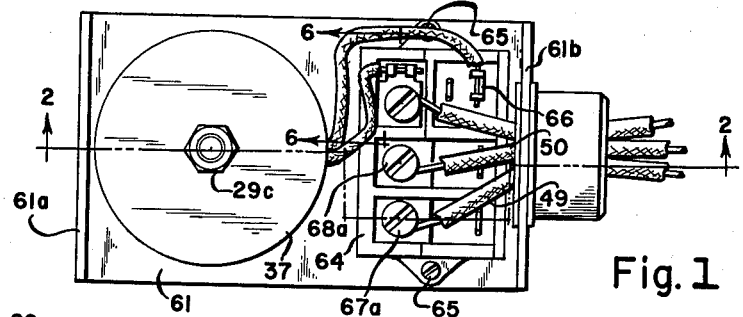
FIG. 1 is a top plan view of a control valve embodying the invention.
Figure 2:
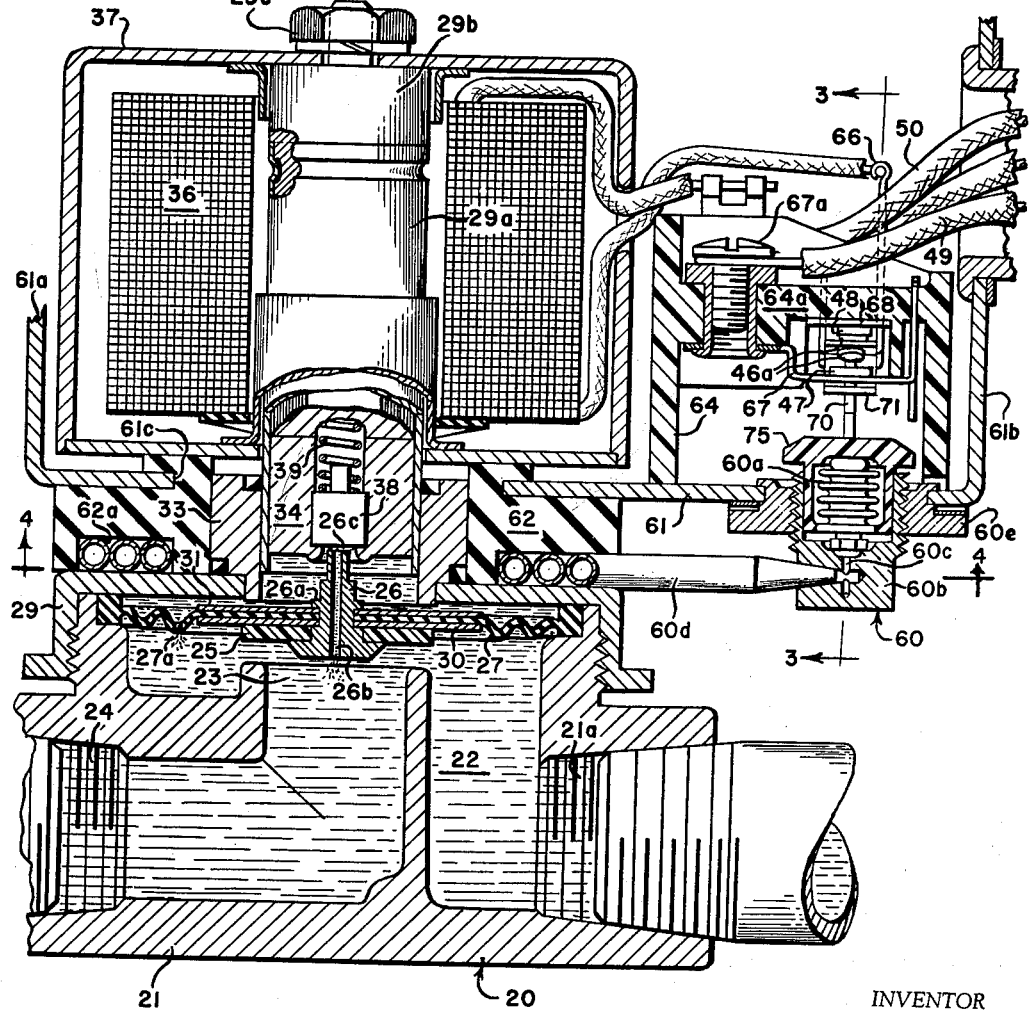
FIG. 2 is a sectional view taken along line 2—2 of FIG. 1 and on a larger scale.
Figure 3:
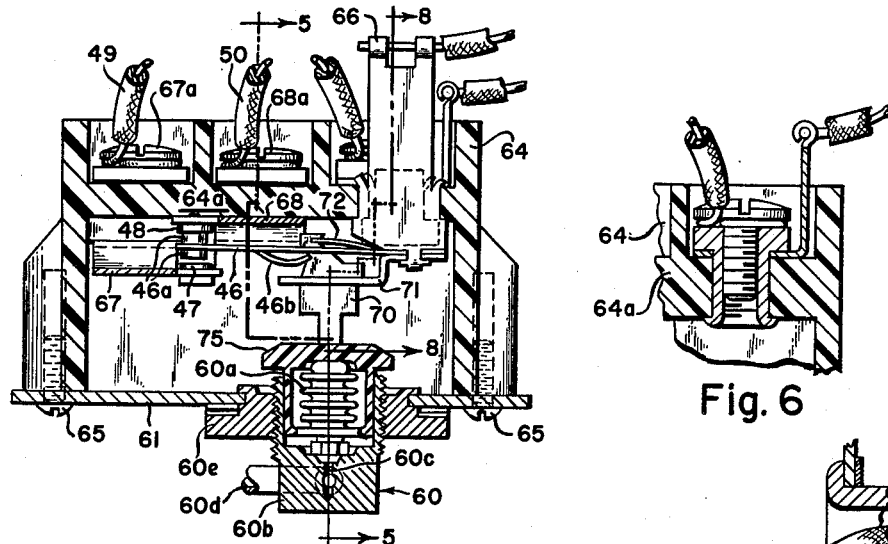
FIG. 3 is a sectional view taken along line 3—3 of FIG. 2.
Figure 4:
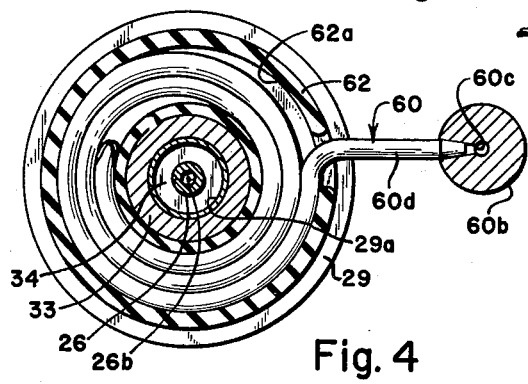
FIG. 4 is a sectional view taken along line 4—4 of FIG. 2, but on a smaller scale.
Figure 5:
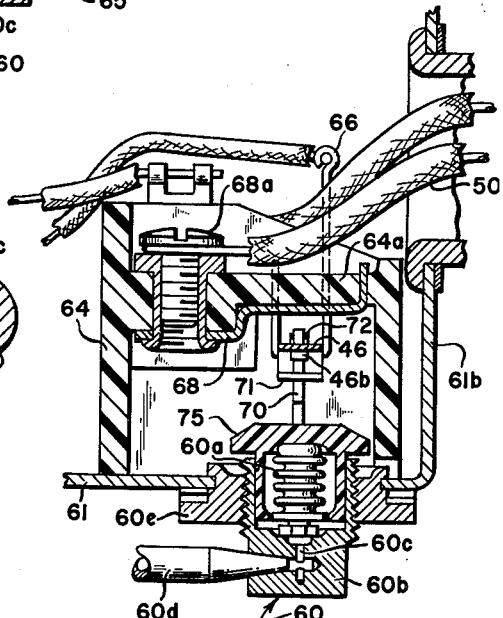
FIG. 5 is a sectional view taken along line 5—5 of FIG. 3.

In the preferred form of the invention, a valve 20 is provided which is adapted to control the flow of a tempering medium, such as hot or cold water, to a radiator type heat exchanger over which air of the room or building is circulated, the valve being opened and closed to regulate the flow of liquid to maintain a desired temperature in the room or building, which may require either cooling or heating of the room air, depending upon the season of the year.

Valve 20 may be of any suitable conventional type which is controlled electrically, such as by a solenoid, and in the present instance it comprises a valve body 21 having an inlet 21a which leads into a circular compartment 22 having a central outlet port 23 formed therein which leads to outlet 24. Port 23 is closed by a valve member 25 which comprises a disc attached to a central stem member 26 and which is moved upwardly and downwardly according to differential in pressure above and below a flexible diaphragm 27, the edges of which are sealingly compressed between an annular ledge about the top of chamber 22 and a cap 29 threaded onto the top of the valve body. Rigid discs 30 and 31 are positioned on opposite sides of the central portion of the diaphragm 27 and serve as backing plates, as shown, and a shoulder 26a on stem 26 is turned downwardly to crimp the valve member backing plates and diaphragm together to prevent leakage of liquid therethrough and to provide a movable valve closing unit.

Stem 26 has a bore 26b therethrough which forms a valve seat 26c at the top portion thereof. Diaphragm 27 has a bleed opening 27a therein which opening is of substantially less flow capacity than bore 26b, the purpose of which will appear hereinafter.

Cap 29 has a sleeve 29a attached thereto, the upper end of which is closed by a suitable plug 29b and the bottom end of which is open to the upper portion of chamber 22 and which bottom end is secured in place by a bushing 33 brazed to the cap as shown. A hexagonal armature 34 is carried inside sleeve 29a and moves vertically therein according to the energization and de-energization of a solenoid 36 which surrounds the sleeve and which includes a frame 37 for establishing magnetic paths to attract armature 34 upwardly when the solenoid is energized. Armature 34 carries a rubber-like pilot valve member 38 in the lower portion of a bore thereof and which valve member is arranged to close pilot port 26c when the armature is in its lower position. Preferably, a compression spring 39 is disposed within the bore of armature 34 and reacts against plug 29b to urge the armature to seat valve member 38 on its port. The valve construction so far described is conventional and it is to be understood that other suitable forms of valves could be employed.

Figure 10:
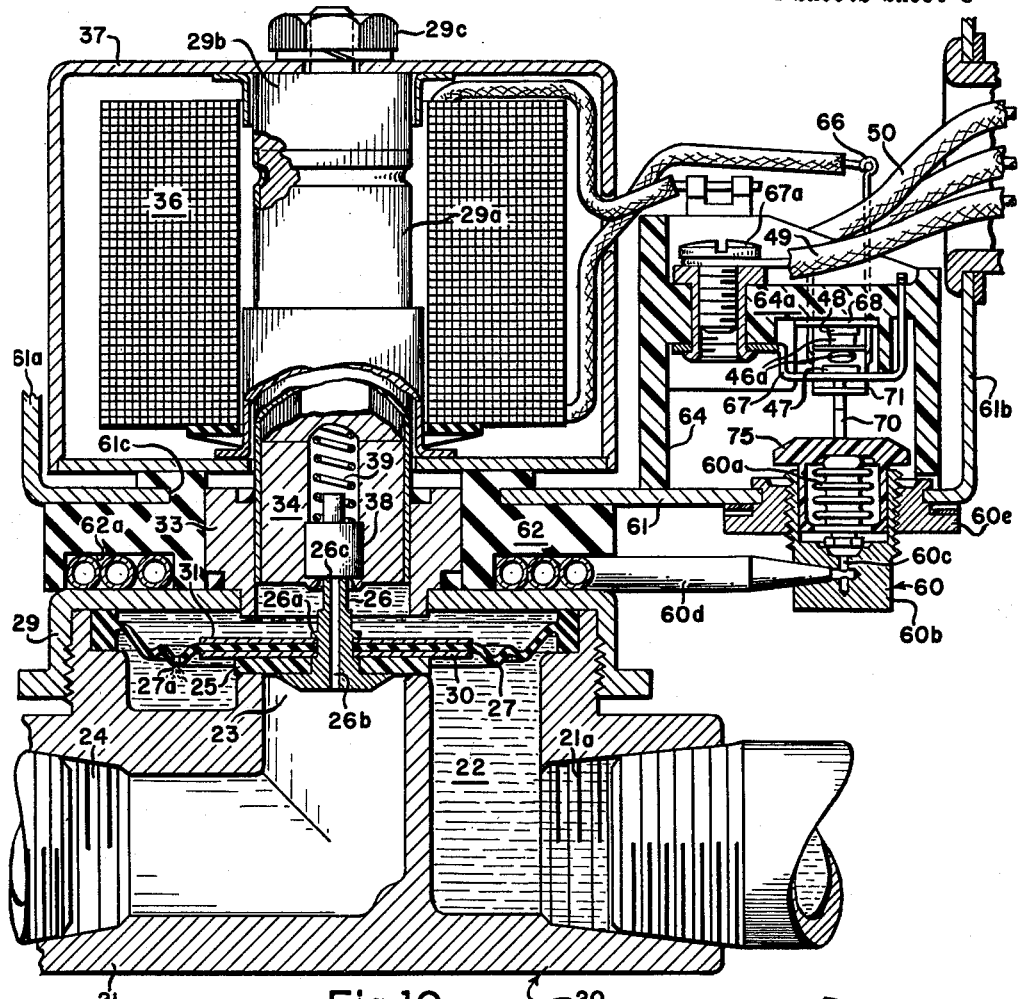
FIG. 10 is a sectional view similar to FIG. 2 but showing the valve in a closed position.

When installed for operation, inlet 21a is connected with a source of heat exchange liquid, such as hot or cold water, depending upon the season of the year, and outlet 24 is connected to the inlet of a suitable radiator type heat exchanger, not shown. When solenoid 36 is deenergized, armature 34 is in its lower position and pilot valve member 38 is closed on pilot port 26c, as is shown in FIG. 10. In this condition, water enters the bleed opening 27a of diapragm 27 and flows to the area above the diaphragm which soon balances the pressure on opposite sides of the diaphragm so that the valve will be in its closed position and, since the outlet port 23 is on the low side of the system the area of the diaphragm over the port opening will be subjected to pressure of the liquid to hold the valve in its closed position. Upon energization of solenoid 36, valve member 38 is removed from port 26c which permits liquid to flow from the upper side of diaphragm 27 through bore 26b faster than it can be replaced through bleed opening 27a which causes a reduction in pressure above the diaphragm therefore permitting the pressure below the diaphragm to open valve member 25 from port 23.

Figure 7:
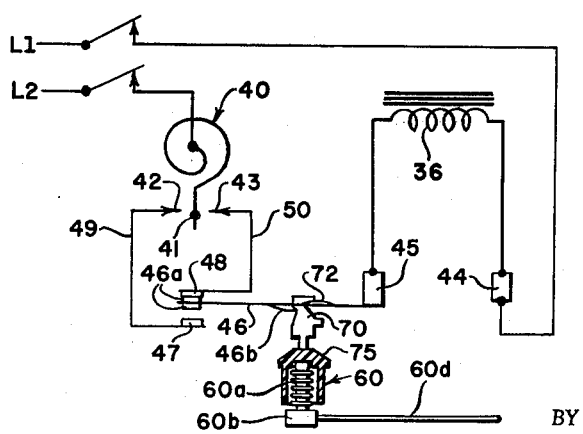
FIG. 7 is a schematic showing of a room thermostat for controlling operation of the valve.

The energization of the solenoid is controlled by a room thermostat shown generally at 40 in FIG. 7 and which may be of any suitable type but for purposes of illustration is shown as a coiled bi-metal which has one end normally fixed and the opposite end carrying a double contact 41, which moves between two spaced fixed contacts 42 and 43. Bi-metal 40 may be located in any suitable position to be responsive to the room air temperature to be controlled. As is usual with such types of thermostats, it may be adjustable to vary the temperatures at which contact 41 engages contacts 42 or 43.

The circuit for solenoid 36 is shown to include line L1 which is connected to a terminal post 44 which in turn is connected to one lead of coil 36, the lead from the opposite end of which is connected to a post 45 which is electrically connected with a movable contact 46 of a snap switch mechanism, described more fully hereinafter, which includes a double contact 46a which is moved with a snap action between fixed contacts 47 and 48. Contact 47 is connected with fixed contact 42 by wire 49 and fixed contact 48 is connected with fixed contact 43 by wire 50. The relatively fixed end of bi-metal thermostat 40 is connected to line L2, which comprises the other side of the circuit including line L1. The power circuit for L1 and L2 may be of any suitable type such as 24-volt A.C., for example.

In the form shown, upon a rise of temperature thermostat 40 moves contact 41 to the right to engage fixed contact 43 and conversely as member 40 cools, it moves contact 41 to the left to contact 42. Preferably, contacts 42 and 43 are spaced apart so that when contact 41 is midway between the two contacts the room temperature will be at a proper degree and the circuit for solenoid 36 will open so that the flow of fluid through valve 20 is prevented.

Figure 9:
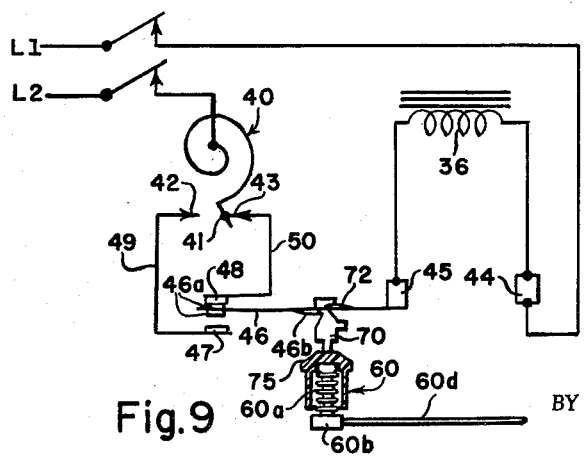
FIG. 9 is a schematic view similar to that of FIG. 7 but showing the room thermostat in a different position.
Figure 8:
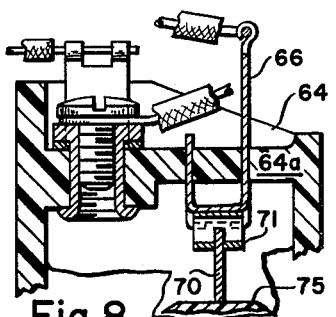
FIG. 8 is a fragmentary sectional view taken along line 8—8 of FIG. 3, but on a larger scale.
Figure 12:
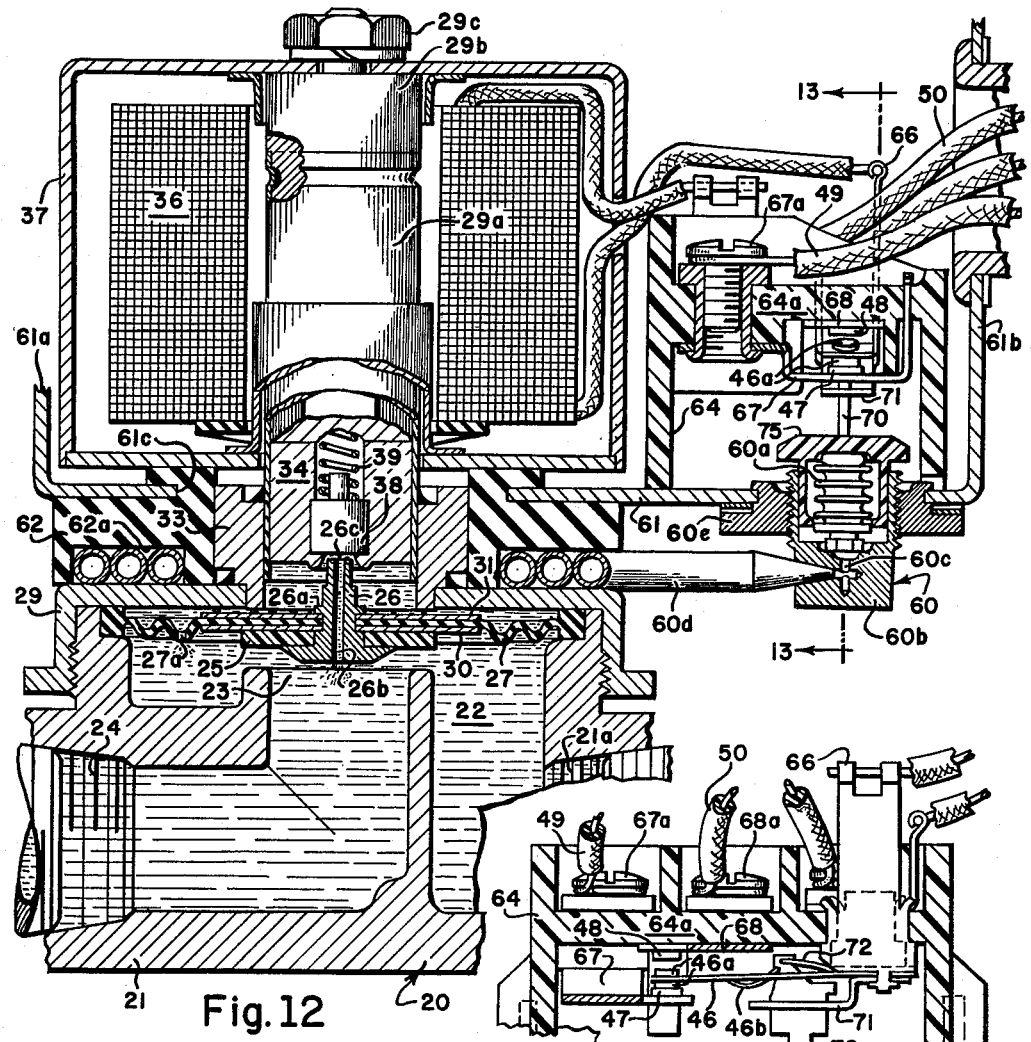
FIG. 12 is a view similar to FIG. 2 but showing the auxiliary thermostat switch mechanism in a different control position.
Figure 13:
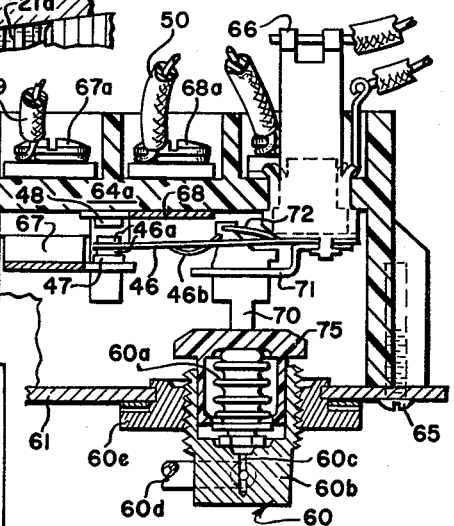
FIG. 13 is a fragmentary sectional view taken substantially along line 13—13 of FIG. 12.
Figure 11:
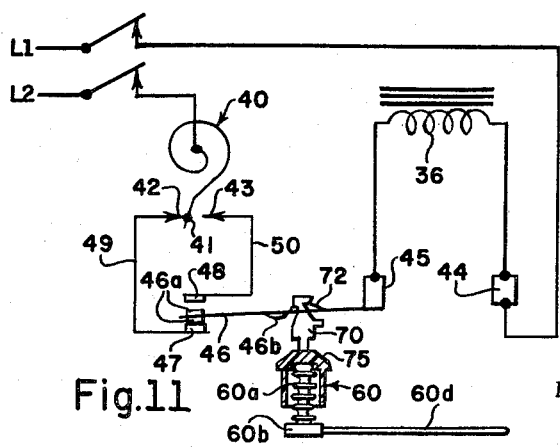
FIG. 11 is a schematic view similar to that of FIG. 7 but showing the room thermostat in still another position.

It will be appreciated that engagement of the contact 43 by the contact 41 upon a rise in room temperature will be effective to complete a circuit through solenoid 36 to open valve 20 to admit cooling liquid to a heat exchanger only if contact 46a engages contact 48 as shown in FIG. 9. It will also be appreciated that engagement of the contact 42 by the contact 41 upon a decrease in room temperature will be effective to complete a circuit through solenoid 36 to open valve 20 to admit heating liquid to a heat exchanger only if contact 46a engages contact 47, as shown in FIG. 11. Accordingly, when weather is warm and cooling liquids are used, it is desirable to have contact 46a engage contact 48, and when weather is cold and heating liquids are used it is desirable to have contact 46a engage contact 47. This is accomplished by a thermostatic device 60 which is responsive to the temperature of the liquid in the heat exchange system or the liquid flowing through valve 20.

The invention is concerned with the details of thermostatic device 60 and its association with the valve 20. The device comprises a plate-like frame member 61 which has two upright walls 61a and 61b at opposite ends thereof. The plate has an opening 61c which surrounds the sleeve 29a and the edges of which opening are inserted in an annular groove formed in a relatively soft rubber collar 62. A suitable snap switch mechanism is disposed in the right end side of plate 61 and it comprises a suitable housing 64 of insulating material, such as Bakelite, which is secured to the plate 61 by screws 65. Housing 64 includes a top wall 64a which has a terminal member 66 imbedded therein which is in the form of a U, the yoke portion of which has a spring contact member 46 secured thereto. A second terminal 67 is imbedded in wall 64a and is generally U-shaped to provide a support for contact 47 and which is provided with a terminal screw arrangement 67a for connection with wire 49. A third terminal 68 projects through wall 64a and provides a support for contact 48 and which includes a terminal screw 68a to which wire 50 is secured.

Contact arm 46 is a flat spring type which has a tongue 46b struck therefrom which is bowed and engages an actuator plate 70 which is arranged to move vertically in a slot formed in the contact arm and which is guided in a slot formed in a guide plate 71 attached to terminal 66. The actuator plate 70 is normally urged downwardly, as viewed in the drawings, by a leaf spring 72 which is secured to terminal post 66 and which engages in a notch formed in actuator plate 70.

Actuator 70 is urged upwardly against the action of spring 72 by a bellows 60a, which is preferably formed of metal and which has its lower end attached to a cup-shaped housing 60b, which housing is bored at 60c to provide a liquid inlet into the interior of the bellows, and a tube 60d is attached to the cup 60b with one end in communication with bore 60c and the opposite end of which is sealed. Tube 60d and bellows contain a liquid which expands and contracts with changes in temperature.

Cup 60b is threaded into a bushing 60e secured in an opening in plate 61 so that bellows 60a is in alignment with actuator 70. An inverted spool 75 of insulating material is adapted to be guidingly movable within cup member 60b and forms an insulating connection between the bellows and the actuator 70.

Tube 60d is coiled in a flat helix and is disposed to lie in flat engagement with the top of cap 29 and to be received in an annular opening 62a formed in collar member 62, the resilient collar serving to press the coil in close heat exchange relation with the cap. When a cooling medium is in the valve, the fluid in tube 60d contracts, allowing spring 72 to force actuator plate 70 down until the end of tongue 46b engaged thereby passes through its dead center position with respect to arm 46, at which time the latter is snapped into position shown in FIG. 9. Thus when a cooling medium is used, the contact 46a is automatically maintained in the appropriate position against contact 48 to condition the circuit for energization of the solenoid 36 when contact 41 of thermostat 40 engages cooling contact 43. On the other hand, when a heating medium is in the valve, the fluid in tube 60d expands the bellows 60a, moving plate 70 upwardly against the action of spring 72 until the end of tongue 46b passes through its dead center position with respect to arm 46, at which time the latter is snapped into the position shown in FIG. 11. Thus, when a heating medium is used, the contact 46a is automatically maintained in the appropriate position against contact 47 to condition the circuit for energization of the solenoid 36 when contact 41 of thermostat 40 engages heating contact 42.

The frame 61a and collar 62, with the coiled tube 60d in place on the top of cap 29, are secured by a nut 29c threaded on a stem projecting upwardly from sleeve plug 29b, and it will be seen that the solenoid and frame can be easily removed by removal of the nut, and that the fluid temperature responsive thermostat 60, including the switch mechanism therefor, can be assembled on the frame as a unit and adapted to the valve as required. In some cases the valve may have uses in which the thermostat 60 is not required and in that case frame 61 can be dispensed with.

The switch mechanism housing 64 provides a convenient terminal block for wiring the solenoid and switch in the room thermostat circuit and thereby provides for a neat and easily connectible apparatus.

From the foregoing description of one form of control valve apparatus embodying the invention, it will be appreciated that there has been provided thereby an improved control valve comprising novel constructions and arrangements of parts whereby a particularly reliable, compact and effective valve mechanism has been achieved. It will also be appreciated that the constructions and arrangements utilized by the invention provide increased adaptability to different types of installations and provide for easier assembly and disassembly for installation and inspection purposes.

Although the invention has been herein described with reference to a specific embodiment and to a particular use, it is understood that the invention includes all such modifications, adaptations, and uses as are reasonably embraced by the scope of the claims hereof.

Having described my invention, I claim:

1. A fluid control apparatus for use in heating and cooling systems, said apparatus comprising a solenoid actuated valve having a valve body and an armature containing sleeve extending from said body, said valve body having a wall adapted to be in heat conducting relation to fluid in the valve and presenting an annular surface surrounding said sleeve, a frame comprising a plate-like member having an opening for receiving said sleeve therethrough, a switch carried by said frame, an expansible member attached to said frame and operatively connected with said switch, a tube connected to said expansible member and containing a thermally responsive fluid for effecting expansion and contraction of said expansible member, said tube being wound in an annular coil complementary to said annular surface of said valve body wall and mounted between said plate-like member and said annular surface, an annular member of resilient insulating material interposed between said annular coil and the plate-like frame member, said resilient member having a collar portion projecting through said opening in said plate-like member and overlying a portion of the latter, a solenoid coil surrounding said sleeve beyond said plate-like member, means to removably attach said solenoid coil to said sleeve including a solenoid coil frame structure having a wall with an opening receiving said sleeve and engaging said collar of said annular member so as to urge said plate-like member and said annular member toward said valve body so that said annular coil is urged against said annular valve body surface by the resilient annular member.

2. A fluid control apparatus as defined in claim 1 and wherein said valve body wall comprises a portion of cap member which is removable from said valve body, whereby said solenoid coil, insulating member, switch frame, switch, sensing element, sleeve and cap member may be removed from said apparatus as a unit.

References Cited in the file of this patent

UNITED STATES PATENTS

| | | |
|---|---|---|
| 1,724,804 | Root | Aug. 13, 1929 |
| 2,072,399 | Giesler | Mar. 2, 1937 |
| 2,121,625 | Crago | June 21, 1938 |
| 2,393,427 | Sparrow | Jan. 22, 1946 |
| 2,598,902 | Garner | June 3, 1957 |
| 2,957,680 | Sterner | Oct. 25, 1960 |

OTHER REFERENCES

Fulton: Folder entitled Sylphon Automatic Unit Heater Control, published prior to November 1935 by The Fulton Sylphon Co., Knoxville, Tenn., 5 pages.